United States Patent
Pleet et al.

(10) Patent No.: US 6,923,496 B1
(45) Date of Patent: Aug. 2, 2005

(54) ANTI-FLUTTER BUMPER FOR HOOD MOUNTED GRILLES

(75) Inventors: Edward Pleet, Livonia, MI (US); Aaron Klop, Birmingham, MI (US); Richard A Kirkdorffer, Saline, MI (US); Martin Lopez, Jr., Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 10/767,659

(22) Filed: Jan. 29, 2004

(51) Int. Cl.[7] .......................................... B60R 27/00
(52) U.S. Cl. ........................ 296/193.11; 180/69.23; 180/69.22; 296/193.1
(58) Field of Search .................. 293/115; 296/193.1, 296/193.11; 180/69.2, 69.21, 69.22, 69.23

(56) References Cited

U.S. PATENT DOCUMENTS

| | | | |
|---|---|---|---|
| 1,653,012 A * | 12/1927 | Jorgensen ................ | 180/69.23 |
| 1,986,772 A * | 1/1935 | Golden ..................... | 180/69.23 |
| 2,131,116 A * | 9/1938 | Northup ................... | 180/69.21 |
| 2,213,010 A * | 8/1940 | MacPherson ........... | 296/203.01 |
| 3,622,174 A | 11/1971 | Wakeen et al. | |
| 3,792,889 A | 2/1974 | Fuener et al. | |
| D253,763 S * | 12/1979 | Legueu ..................... | D12/173 |
| 4,645,250 A | 2/1987 | Bauer et al. | |
| 4,834,436 A | 5/1989 | Nguyen | |
| 4,860,326 A * | 8/1989 | Mutoh ........................ | 377/58 |
| 4,883,139 A | 11/1989 | Gross | |
| 5,092,550 A * | 3/1992 | Bettini ....................... | 411/182 |
| 5,314,280 A * | 5/1994 | Gagliardi et al. .......... | 411/182 |
| 5,403,048 A * | 4/1995 | Ekladyous et al. ........ | 293/115 |
| 5,478,127 A * | 12/1995 | Chase ........................ | 293/115 |
| 5,482,348 A * | 1/1996 | Mass et al. ................ | 296/207 |
| 5,503,444 A | 4/1996 | Rouse et al. | |
| 6,119,306 A * | 9/2000 | Antonucci et al. ......... | 296/207 |
| D445,739 S * | 7/2001 | Price ......................... | D12/173 |
| 6,422,643 B1 | 7/2002 | Pease | |
| 6,507,976 B2 * | 1/2003 | Ichimaru ..................... | 16/82 |
| 6,669,274 B2 * | 12/2003 | Barnard et al. ......... | 296/193.1 |

* cited by examiner

*Primary Examiner*—Kiran B. Patel
(74) *Attorney, Agent, or Firm*—Gigette M. Bejin

(57) ABSTRACT

A bracket/pad anti-flutter grille bumper attached to a motor vehicle frame or front bumper to reduce the vibrations of a hood-mounted grille resulting from road forces or from slamming the hood shut. Alternative mounting of the bracket on an impact absorbing and collapsible bumper assembly allow for movement of the grille on impact, while maintaining the anti-flutter feature when the bumper returns to its normal position.

4 Claims, 3 Drawing Sheets

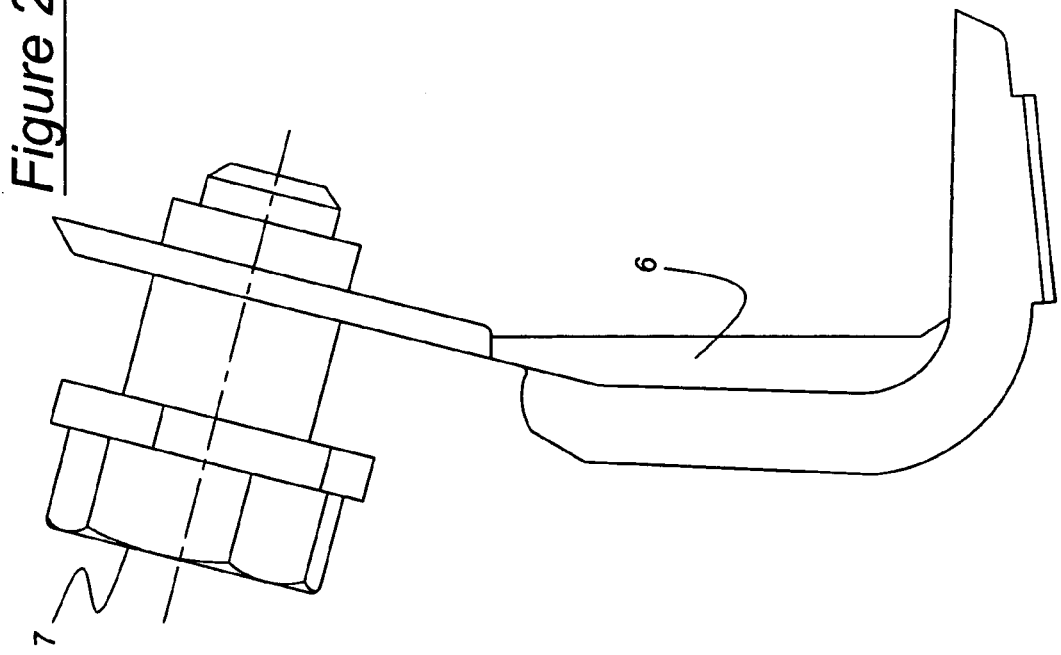
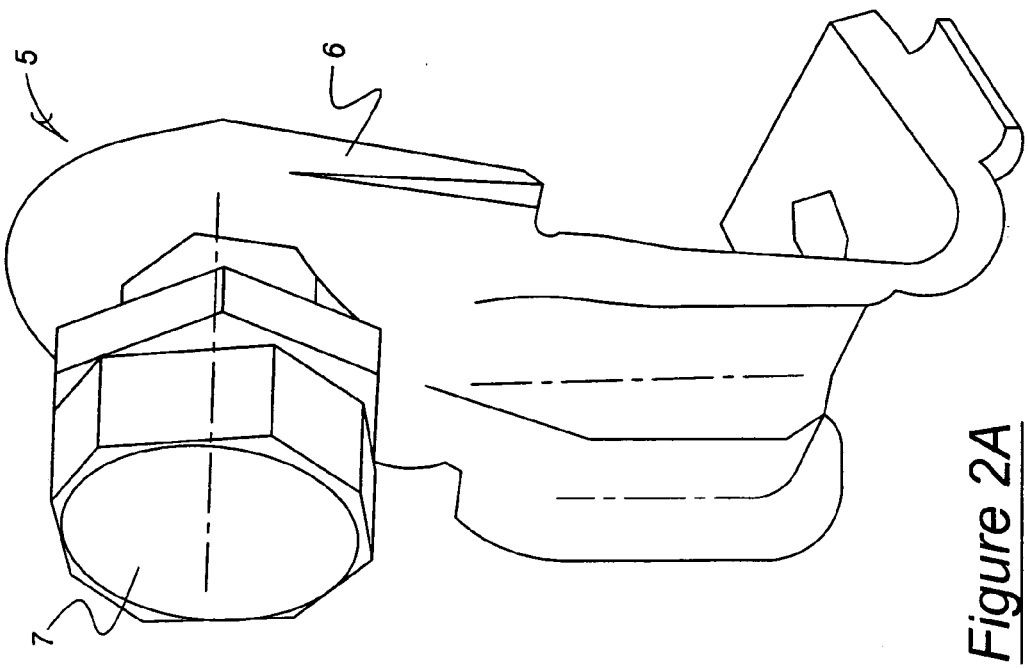

ANTI-FLUTTER BUMPER FOR HOOD MOUNTED GRILLES

BACKGROUND

The invention relates generally to motor vehicle grilles positioned at the front ends of vehicles, and in particular to grilles attached to the hoods of motor vehicles.

Automobile and truck grilles originally served as a protective barrier and as a source of ventilation for the radiator. Today, grilles continue to provide a ventilation function, but also normally serve as decorative features and are often incorporated into the vehicle bumper for aerodynamic and styling purposes. On some vehicles, design esthetics or engineering considerations have resulted in the grilles being attached only at their upper edge to the vehicle's hood. For instance, government regulations mandate automobile bumpers that can absorb low-speed impacts without damage. Bumpers that contract up to 3 or 4 inches on frontal impact and then automatically rebound from the impact accomplish this. The possibility of bumper contraction has necessitated a redesign of automobile grilles. Various solutions to this grille design problem have arisen, including grilles that are attached to the hood in some fashion so they can swing back out of the way on impact or grilles that can resiliently deflect with the stroke of the bumper.

Such hood-mounted grilles are minimally attached to the hood at their upper end so as to be capable of movement during impact. Depending on the amount of bracing included in the attachment, such grilles may become susceptible to aerodynamic and road-induced vibrations and flutter when the hood is in its closed position. This problem is generally solved by costly additional reinforcements attached to the grille itself. For example, in U.S. Pat. No. 5,478,127, the grille has a dual support arrangement in which an upper edge is resiliently attached directly to the automobile engine hood and the lower edge is resiliently supported by additional support members that connect the grille's lower edge to the engine hood. This solution obviously entails added weight, complexity, and manufacturing costs.

Accordingly, what is needed is a simple and economical means to prevent vibrations in a vehicle having a hood-attached grille.

SUMMARY

In a preferred embodiment, the invention provides a simple but effective means to eliminate road-induced flutter and vibration in a vehicle having a hood-attached grille. A bracket containing an attached vibration-absorbing pad is mounted on the vehicle body such that some part of the interior lower edge of the hood-attached grille is in constant contact with the pad when the hood is in a closed position. The bracket may be attached to the energy-absorbing bumper of an automobile, to permit the grille to be displaced inwardly with the bumper upon impact. A contour may be provided in the interior surface of the grille to match the pad. One or more anti-flutter bumpers may be used.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 2a is a perspective view of an exemplary anti-flutter bumper bracket and pad.

FIG. 2b is a side view of the exemplary anti-flutter bumper bracket and pad.

DETAILED DESCRIPTION

Figure 1:
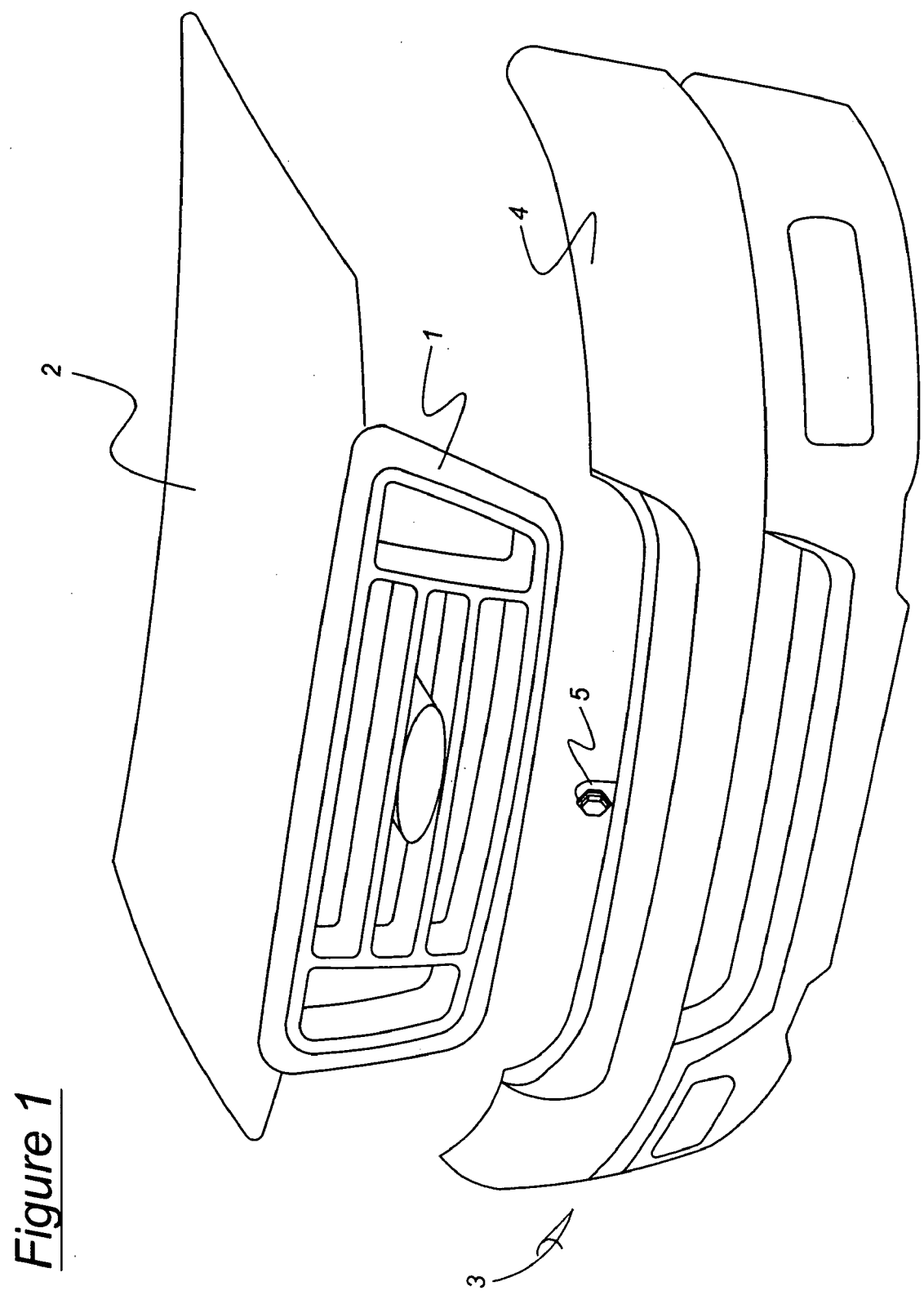
FIG. 1 is a frontal perspective view of a hood-mounted grille and accompanying vehicle bumper system in an open position.

FIG. 1 shows an exemplary front prospective view of the hood 2 and bumper system 3 of a vehicle. The upper edge of the grille 1 is attached to the front edge of the hood 2 to form a "hood-mounted grille". For convenience of this description, the hood 2 and grille 1 are shown suspended above the front bumper system 3. The bumper system 3 is shown to include a fascia 4, which is rigidly attached to a vehicle bumper 9. The fascia is shown to have a recess 8 that is centrally located to receive the grill when the hood 2 is in its closed position, When the hood 2 is closed, the grille 1 is not in contact with the fascia 4.

In order to limit the occurrence of flutter and vibration at the lower end of the grille 1, an anti-flutter bumper 5 is shown that contacts the lower end of the grille 1. The anti-flutter bumper 5 may be attached to either the vehicle bumper 9, to the frame of the vehicle or to any other component that will support the vibration. When the hood 2 is closed, the anti-flutter bumper 5 forms an interference fit with the interior (inward facing) lower edge of the grille, thereby preventing the grille from vibrating during vehicle operation over the road or from oscillating when the hood is slammed shut.

FIG. 2a and FIG. 2b show a perspective and side view of the anti-flutter bumper 5. The bumper 5 includes a bracket 6 and a resilient pad 7. The resilient pad 7 attached to the upper part of the bracket 6. The bracket 6 may be attached to the frame of the vehicle directly or to the front vehicle bumper 9. The front bumper 9 is attached to the vehicle frame (not shown). If the front bumper is an impact-absorbing bumper, common on automobiles, the anti-flutter bumper would preferably be attached to it directly, interior to the grille. In either case, the anti-flutter bumper 5 is positioned such that it is in contact with the interior side of the grille with some slight tension when the hood is shut thereby forming an interference fit. The resilient pad 7 may be composed of rubber, plastic, nylon, a spring, or any suitable vibration-absorbing material. The interior grille surface may be contoured to match the anti-flutter bumper at the point of contact.

Figure 3:
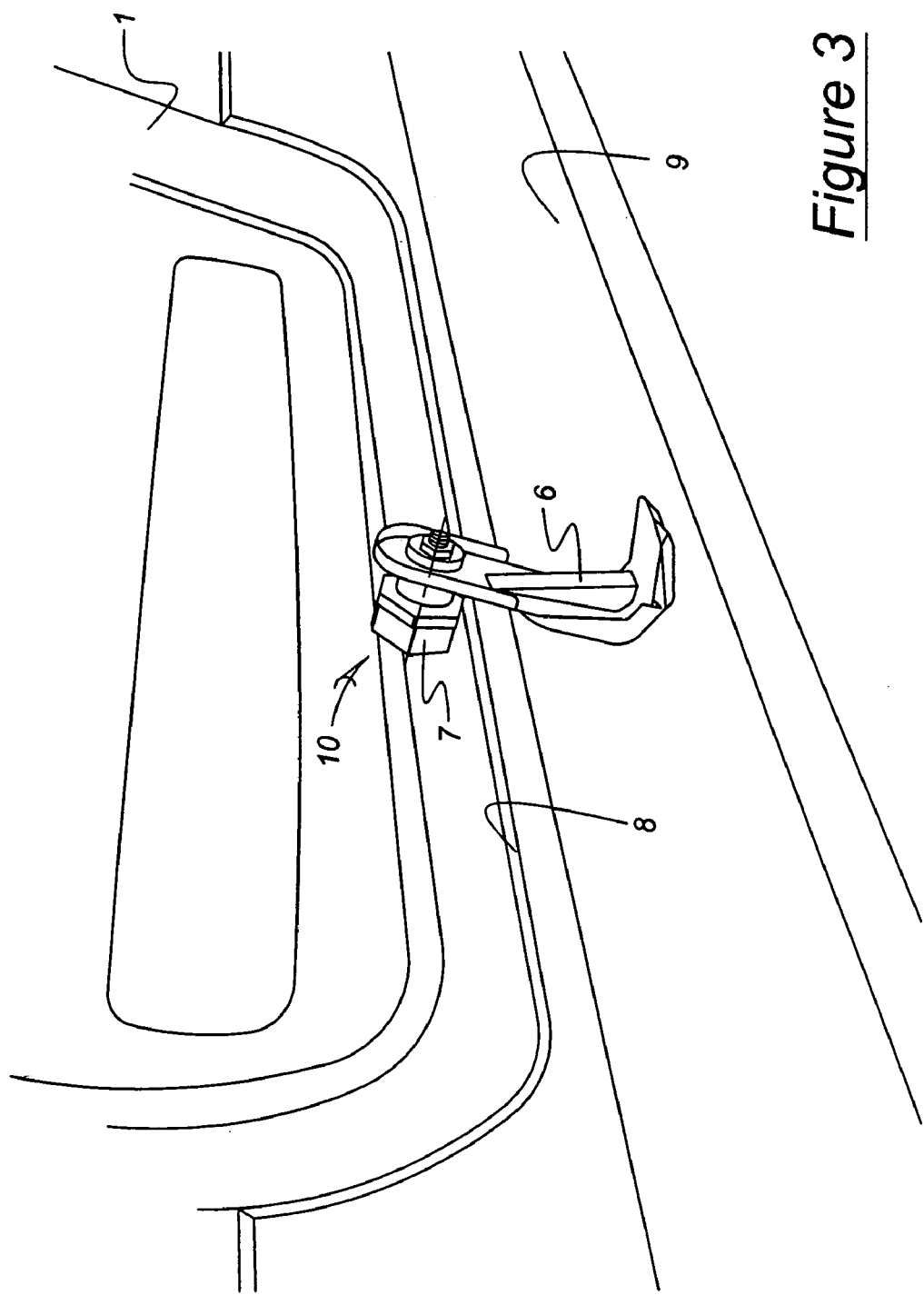
FIG. 3 is an interior perspective view of the anti-flutter bumper with the grille in a closed position.

FIG. 3 is a perspective interior view of the hood-mounted grille 1 in a closed position. The anti-flutter bumper 5 is shown attached to the vehicle bumper 9. The vibration-absorbing pad 7 of the anti-flutter bumper 5 is shown forming an interference fit with a contour surface 10 of the grille 1.

While only one embodiment of the anti-flutter grille bumper has been described, others are possible without departing from the scope of the appended claims. One or more anti-flutter grille bumpers may be used.

What is claimed is:

1. An anti-flutter grille bumper for a motor vehicle having a hood-mounted grille suspended above an energy-absorbing front bumper, said anti-flutter grille bumper comprising:
   a bracket attached to the energy-absorbing front bumper of the motor vehicle, interior to the hood-mounted grille; and
   a resilient pad mounted on said bracket;
   wherein, said resilient pad forms an interference fit with the hood-mounted grille when the hood is in a closed position.

2. The anti-flutter grille bumper of claim 1 wherein the grille is contoured to fit the anti-flutter grille bumper pad at the point of contact.

3. The grille bumper of claim 1 wherein said resilient pad is rubber.

4. A method of reducing flutter and vibration from a hood-mounted grille of an automobile that is suspended above an impact-absorbing front bumper, said method comprising attaching at least one anti-flutter grille bumper to said impact-absorbing front bumper interior to said grille forming an interference fit with said grille when the hood is shut.

* * * * *